(12) United States Patent
Norimatsu et al.

(10) Patent No.: US 6,743,284 B2
(45) Date of Patent: Jun. 1, 2004

(54) PRINTING INK COMPOSITION

(75) Inventors: Takahiro Norimatsu, Hekinan (JP); Akihiko Taniguchi, Nagoya (JP); Masaya Fujioka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/920,738

(22) Filed: Aug. 3, 2001

(65) Prior Publication Data
US 2002/0043179 A1 Apr. 18, 2002

(30) Foreign Application Priority Data

Aug. 10, 2000 (JP) ........................................ 2000-242041

(51) Int. Cl.$^7$ .............................................. C09D 11/00
(52) U.S. Cl. .................................. 106/31.58; 106/31.86
(58) Field of Search ............................. 106/31.58, 31.86

(56) References Cited

U.S. PATENT DOCUMENTS

| | | | | | |
|---|---|---|---|---|---|
| 5,560,770 A | * | 10/1996 | Yatake | ..................... | 106/31.43 |
| 5,707,433 A | * | 1/1998 | Kuge et al. | ............... | 106/31.86 |
| 5,938,829 A | * | 8/1999 | Higashiyama et al. | ... | 106/31.58 |
| 6,004,389 A | * | 12/1999 | Yatake | ..................... | 106/31.86 |
| 6,048,914 A | * | 4/2000 | Goto et al. | .................. | 523/161 |
| 6,051,629 A | * | 4/2000 | Ichikawa et al. | ........... | 523/161 |
| 6,123,502 A | * | 9/2000 | Adams et al. | ............ | 414/752.1 |

FOREIGN PATENT DOCUMENTS

JP     A 62-101672     5/1987

* cited by examiner

*Primary Examiner*—Elizabeth D. Wood
*Assistant Examiner*—Veronica F. Faison
(74) *Attorney, Agent, or Firm*—Oliff & Berridge, PLC

(57) ABSTRACT

A printing ink composition is provided comprising water, a coloring agent and at least two types of polyalkylene glycol alkyl ethers each having at least one oxyalkylene in its polyoxyalkylene group, wherein at least one of the polyalkylene glycol alkyl ethers is polypropylene glycol n-butyl ether having three or more oxypropylenes in its molecule. This printing ink composition can inhibit color bleeding not only on a printing medium specifically designed for ink-jet printing but also on plain paper.

20 Claims, No Drawings

PRINTING INK COMPOSITION

BACKGROUND OF THE INVENTION

1. Field of Invention

The invention relates to a printing ink composition, more specifically relates to a water-based printing ink composition suitable for ink-jet printing.

2. Description of Related Art

Ink-jet printing has been conducted on various ink-jet systems. These system include an electric control system in which electrostatic suction is utilized to eject ink, a pressure pulse system in which mechanical vibration or displacement of ink caused by a piezoelectric element is utilized to eject ink, and a thermal ink-jet system in which pressure produced by bubbles formed and grown by heat is utilized to eject ink. Under these systems, drops of ink are generated, and then, the drops of ink in part or in entirety are attached to printing mediums so as to print images thereon.

In such ink-jet printing, water-based ink is commonly used. The water-based ink comprises a water-based solvent (such as water or a mixture of water and a water-soluble organic solvent) and a coloring material (such as a water-soluble dye or pigment) dissolved or dispersed in the water-based solvent. Ink-jet printing can be conducted with good quality in the long term by using the water-based ink, on the condition that the water-based ink has appropriate properties (such as viscosity, surface tension, conductivity and density), that the properties of the ink do not change by heating so as to not form a precipitate, which causes clogging of a nozzle or an orifice of an ink-jet printer, and that the ink has high water resistance and high light resistance.

Recently, there has been a growing need to perform ink-jet printing with water-based ink on plain paper rather than on printing sheets designed specifically for ink-jet printing. However, conventional water-based ink is prone to spread over the plain paper and causes bleeding of ink where ink of different colors are arranged adjacently (hereinafter referred to as "color bleeding"). A number of proposals have been made to provide water-based ink that does not cause color bleeding even on plain paper in ink-jet printing. However, the proposed inks fall short of satisfying required image quality.

SUMMARY OF THE INVENTION

The invention has been developed to overcome the above-mentioned and other problems. According to an aspect of the invention, there is provided an ink composition comprising water, a coloring agent and at least two types of polyalkylene glycol alkyl ethers, each having at least one oxyalkylene in its polyoxyalkylene group, wherein at least one of the polyalkylene glycol alkyl ethers is polypropylene glycol n-butyl ether having three or more oxypropylenes in the molecule. It becomes possible to inhibit color bleeding when ink-jet printing with the ink composition of the present invention.

DETAILED DESCRIPTION OF PREFERRED EMBODIMENTS

As used herein, the prefix "poly" is used to denote compounds having one or more oxyalkylenes. Thus, unless otherwise indicated, the polyalkylene glycol alkyl ethers described herein include monooxyalkylene glycol alkyl ethers, such as ethylene glycol n-butyl ether; dioxyalkylene glycol alkyl ethers, such as diethylene glycol n-butyl ether; and polyoxyalkylene glycols having three or more oxyalkylenes.

A printing ink composition of the invention comprises water, a coloring agent, and at least two types of polyalkylene glycol alkyl ethers, each having at least one oxyalkylene in a polyoxyalkylene group, where at least one of the polyalkylene glycol alkyl ethers is polypropylene glycol n-butyl ether having at least three oxypropylenes in the molecule. Hereinafter, for brevity, the polyalkylene glycol alkyl ether having at least one oxyalkylene in the polyoxyalkylene group is referred to as "polyalkylene glycol alkyl ether," whereas the polypropylene glycol n-butyl ether having at least three oxypropylenes in the molecule is referred to as "polypropylene glycol n-butyl ether."

The coloring agent is used in an amount of 0.1 to 20% by weight, preferably 0.3 to 15% by weight and more preferably 0.5 to 10% by weight, based on the total weight of the printing ink composition. As the coloring agent, any dyes and pigments can be used alone or in combination. In particular, it is preferable to use water-soluble dyes including direct dyes, acid dyes, basic dyes and reactive dyes, among the dyes. It is also preferable to use inorganic pigments and organic pigments.

Representative examples of water-soluble dyes useful in the invention are C.I. Direct Black 17, 19, 32, 51, 71, 108, 146, 154 and 168, C.I. Direct Blue 6, 22, 25, 71, 86, 90, 106 and 199, C.I. Direct Red 1, 4, 17, 28, 80, 83 and 227, C.I. Direct Yellow 12, 24, 26, 86, 98, 132 and 142, C.I. Direct Orange 34, 39, 44, 46 and 60, C.I. Direct Violet 47 and 48, C.I. Direct Brown 109, C.1. Direct Green 59, C.I. Acid Black 2, 7, 24, 26, 31, 52, 63, 112 and 118, C.I. Acid Blue 9, 22, 40, 59, 93, 102, 104, 113, 117, 120, 167, 229 and 234, C.I. Acid Red 1, 6, 32, 37, 51, 52, 80, 85, 87, 92, 94, 115, 181, 256, 289, 315 and 317, C.I. Acid Yellow II, 17, 23, 25, 29, 42, 61 and 71, C.I. Acid Orange 7 and 19, C.I. Acid Violet 49, C.I. Basic Black 2, C.I. Basic Blue 1, 3, 5, 7, 9, 24, 25, 26, 28 and 29, C.I. Basic Red 1, 2, 9, 12, 13, 14 and 37, C.I. Basic Violet 7, 14 and 27, and C.I. Food Black 1 and 2.

The above-mentioned dyes are suitable for ink-jet printing and offer good performance with great clarity, high water solubility, high stability and high light resistance. However, the dyes useful in the present invention are not limited to the above.

Representative examples of inorganic pigments useful in the invention are carbon black, titanium oxides, and iron oxides.

Representative examples of organic pigments are azo pigments (such as azo lakes, insoluble azo pigments, condensed azo pigments, and chelate azo pigments), polycyclic pigments (such as phtalocyanine pigments, perylenes and perylene pigments, anthraquinone pigments, quinacridone pigments, dioxazine pigments, thioindigo pigments, isoindolinone pigments, and quinophthalone pigments), lake pigments (such as base dye lakes, and acid dye lakes), nitro pigments, nitroso pigments, and aniline black daylight fluorescent pigments.

It should also be noted that the pigment useful in the invention is not limited to the above. For example, it is possible to use any other pigment capable of being dispersed in a water phase, or to use pigments of which the surface has been treated with a surfactant or a polymeric dispersing agent (such as graphite carbon).

In the case of using pigments as the coloring agent, the printing ink composition may be provided by dispersing the pigment in a mixture of the purified water and the polyalkylene glycol alkyl ethers with a dispersing agent according to a conventional method, for example, disclosed in Japanese Laid-Open Patent Publication No. 62-101672, which is herein incorporated by reference. Generally, 0.01 to 20% by weight of the dispersing agent is added into the mixture, based on the total weight of the printing ink composition. Other additives may be added, if necessary.

Typical examples of dispersing agents are polymeric dispersing agents or surfactants as disclosed in Japanese Laid-Open Patent Publication No. 62-101672. Any combination of the polymeric dispersing agents and/or the surfactants as well as one of them alone can be used.

Representative examples of polymeric dispersing agents useful in the invention are gelatin, proteins (such as albumin), natural gum materials (such as gum arabic and gum tragacanth), glucosides (such as saponin), cellulose derivatives (such as methyl cellulose, carboxycellulose and hydroxymethyl cellulose), natural polymers (such as lignosulfonates and shellac), anionic polymers (such as polyacrylates, salts of styrene/acrylate copolymers, salts of vinylnapthalene/acrylate copolymers, salts of styrene/maleate copolymers, salts of vinylnapthalene/maleate copolymers, salts of b-napthalene sulfonic formalin condensates and phosphates), and non-ionic polymers (such as polyvinyl alcohol, polyvinyl pyrrolidone and polyethylene glycol).

Representative examples of surfactants useful in the invention are anionic surfactants (such as fatty alcohol sulfates and alkylarylsulfonates), and non-ionic surfactants (such as polyoxyethylene alkyl ethers, polyoxyethylene alkyl esters, sorbitan alkyl esters and polyoxyethylene sorbitan alkyl esters).

The dispersion can be conducted by using any conventional dispersing machine, such as a ball mill, a roll mill and a sand mill, preferably by using a high-speed sand mill.

According to the invention, the polyalkylene glycol alkyl ethers used in the ink composition are considered particularly important to inhibit color bleeding. It is preferable to use polyalkylene glycol alkyl ethers having five or fewer carbons in its alkyl groups and twelve or fewer carbons in its oxyalkylene groups, respectively, among various polyalkylene glycol alkyl ethers, for the reason that polyalkylene glycol alkyl ethers of relatively long molecular chains have high viscosity and are generally not suitable for ink-jet printing. Particularly, it is essential that at least one of the polyalkylene glycol alkyl ethers is polypropylene glycol n-butyl ether.

The polyalkylene glycol alkyl ethers, other than the polypropylene glycol n-butyl ether, useable in the invention are typified by polyethylene glycol alkyl ethers and polypropylene glycol alkyl ethers.

Representative examples of the polyethylene glycol alkyl ethers useful in the invention are ethylene glycol methyl ether, ethylene glycol ethyl ether, ethylene glycol n-propyl ether, ethylene glycol isopropyl ether, ethylene glycol n-butyl ether, ethylene glycol isobutyl ether, diethylene glycol methyl ether, diethylene glycol ethyl ether, diethylene glycol n-propyl ether, diethylene glycol isopropyl ether, diethylene glycol n-butyl ether, diethylene glycol isobutyl ether, triethylene glycol methyl ether, triethylene glycol ethyl ether, triethylene glycol n-propyl ether, triethylene glycol isopropyl ether, triethylene glycol n-butyl ether and triethylene glycol isobutyl ether.

Representative examples of the polypropylene glycol alkyl ethers useful in the invention are propylene glycol methyl ether, propylene glycol ethyl ether, propylene glycol n-propyl ether, propylene glycol isopropyl ether, propylene glycol n-butyl ether, propylene glycol isobutyl ether, dipropylene glycol methyl ether, dipropylene glycol ethyl ether, dipropylene glycol n-propyl ether, dipropylene glycol isopropyl ether, dipropylene glycol n-butyl ether, dipropylene glycol isobutyl ether, tripropylene glycol methyl ether, tripropylene glycol ethyl ether, tripropylene glycol n-propyl ether, and tripropylene glycol isopropyl ether.

Representative examples of the polypropylene glycol n-butyl ether are tripropylene glycol n-butyl ether, tetrapropylene glycol n-butyl ether, and pentapropylene glycol n-butyl ether.

It is considered that the effect of inhibiting color bleeding is produced as follows in the printing ink composition of the invention. Generally, color bleeding occurs in a printing ink composition that is slow to permeate through a printing medium and is slow to dry. In other words, color bleeding does not occur, unless ink compositions of different colors blend while permeating through the printing medium and before drying. Any of the above-mentioned polyalkylene glycol alkyl ethers, which is not polypropylene glycol n-butyl ether, is dispersed uniformly in the printing ink composition, and improves the ability of the printing ink composition to permeate through a printing medium and to dry slightly at a uniform rate through the ink composition. In addition, the polypropylene glycol n-butyl ether is more likely to be localized at an interface between the ink composition and the air, and increases an initial permeation rate of the ink composition at the time when the ink composition is attached to the printing medium. As a result, the combination of the polyalkylene glycol alkyl ether and the polypropylene glycol n-butyl ether, due to their structural similarity, helps drops of the ink composition permeate from their surface to their core into the printing medium continuously and smoothly. It becomes therefore possible to inhibit color bleeding effectively in the printing ink composition according to the invention.

As described above, inhibiting color bleeding is not as effective when one type of polyalkylene glycol alkyl ether or polypropylene glycol n-butyl ether is used alone in the ink composition. If at least two types of polyalkylene glycol alkyl ethers are used, but all of them are polypropylene glycol n-butyl ethers, color bleeding may be reduced slightly. However, it is more effective to inhibit color bleeding even on plain paper when the polypropylene glycol n-butyl ether is used in combination with another polyalkylene glycol alkyl ether, which is not polypropylene glycol n-butyl ether.

Moreover, color bleeding can not be prevented, even if any conventional surfactant is used in place of the polypropylene glycol n-butyl ether in the ink composition. There are some conceivable reasons for this. One is that the polypropylene glycol n-butyl ether has a smaller molecular size and is capable of moving to the interface between the ink composition and the air faster than conventional surfactant. Another is that, as already mentioned above, the polypropylene glycol n-butyl ether has structural similarity to the other polyalkylene glycol alkyl ether so that the ink composition permeates into the printing medium continuously and smoothly.

The polyalkylene glycol alkyl ethers are used in total in an amount of 2 to 15% by weight, preferably 3 to 12% by weight and more preferably 4 to 10% by weight, based on the total weight of the printing ink composition. If the printing ink composition comprises less than 2% by weight of the polyalkylene glycol alkyl ethers, the ink composition is slow to permeate through the printing medium and to dry, which results in color bleeding. On the other hand, if the printing ink composition comprises more than 15% by weight of the polyalkylene glycol alkyl ethers, the ink composition permeates through the printing medium too much. This presents problems in that the ink composition reaches the back side of the printing medium and bleeding of the ink composition along fibers of the printing medium (which is called "feathering") is caused.

Further, a ratio between the polyalkylene glycol alkyl ethers and the polypropylene glycol n-butyl ether is determined in view of a formula and any desired properties of the printing ink composition. Generally, the polyalkylene glycol alkyl ethers except for any polypropylene glycol n-butyl ether is used in an amount of 1 to 80% by weight, preferably 3 to 60% by weight and more preferably 5 to 50% by weight, based on the total weight of the polyalkylene glycol alkyl ethers including the polypropylene glycol n-butyl ether.

As the water, water of high purity (such as ion-exchanged water and distilled water) should be used. In other words, non-purified water (such as tap water, well water and natural water) should not be used. The content of the purified water is determined in view of the types and contents of the coloring agent and the polyalkylene glycol alkyl ether and any desired properties of the printing ink composition. In general, the printing ink composition comprises 10 to 98% by weight, preferably 30 to 97% by weight and more preferably 40 to 95% by weight of the purified water, based on the total weight of the printing ink composition.

The printing ink composition of the invention may further comprises other additives, such as dispersing agents, surfactants, viscosity adjusting agents, surface tension adjusting agents, pH adjusting agents, antiseptics and fungicides, as necessary.

For example, an agent that promotes liquid stability of the printing ink composition (hereinafter referred to as a liquid stabilizer) may be added to prevent the printing ink composition from drying at the nozzles of ink-jet printers. Representative examples of liquid stabilizers useful in the invention are polyalcohols (such as ethylene glycol, diethylene glycol, triethylene glycol, polyethylene glycol, propylene glycol, dipropylene glycol, tripropylene glycol, polypropylene glycol, 1,3-butanediol, 1,5-pentanediol, 1,6-hexanediol, glycerin, 1,2,6-hexanetriol, 1,2,4-butanetriol, 1,2,3-butanetriol and 1,3,5-pentanetriol), nitrogen-containing heterocyclic compounds (such as N-methyl-2-pyrrolidone, N-hydroxyethyl-2-pyrrolidone, 2-pyrrolidone, 1,3-dimethyl imidazolidinone and caprolactam), amides (such as formamide, N-methylformamide and N,N-dimethylformamide), amines (such as monoethanolamine, diethanolamine, triethanolamine, monoethylamine, diethylamine and triethylamine), and sulfur-containing compounds (such as dimethyl sulfoxide, sulfolane and thiodiethanol). Any combination of the above-mentioned liquid stabilizers as well as one of them may be chosen depending on particular needs. The content of the liquid stabilizer is determined in view of components and any desired properties of the printing ink composition. In general, the printing ink composition comprises 0 to 40% by weight, preferably 5 to 30% by weight, of the liquid stabilizer, based on the total weight of the printing ink composition.

In the case of a printing ink composition that is electrically charged in order to be ejected from an ink-jet printer, it is generally necessary to add a resistance adjusting agent into the ink composition. Typical examples of the resistance adjusting agent are inorganic salts, such as lithium chloride, ammonium chloride and sodium chloride.

Further, in the case of a printing ink composition that is ejected under the influence of heat, it is generally necessary to select each component of the ink composition and its content, so as to adjust thermal properties (such as resistivity, coefficient of thermal expansion, and coefficient of thermal conductivity) appropriately.

The printing ink composition of the invention, given as described above, provides solutions to problems in known compositions, and ensures ink-jet printing of good image quality with no color bleeding.

The invention will be specifically illustrated in more detail by way of the following synthetic examples and the following comparative examples.

[Ink Preparation] In each of Examples 1 to 14 and Comparative Examples 1 to 14, printing ink compositions of four colors: black, cyan, magenta and yellow are provided respectively by mixing components in the respective amounts indicated in Tables 1 to 28 and filtering the mixture by 0.8 mm membrane filters. In Tables 1 to 28, "%" representing proportional amounts is based on weight, unless otherwise specifically indicated.

Herein, it should be noted that Examples 1 to 14 are intended to compare with Comparative Examples 1 to 14, respectively. Because of this, some of the ink compositions of the examples (for example, the ink compositions of Examples 3 and 4) are identical with each other, but are provided herein by intention.

The printing ink compositions of Examples 1 to 14 comprise tripropylene glycol n-butyl ether as polypropylene glycol n-butyl ether, while the printing ink compositions of Comparative Examples 1 to 14 do not comprise any polypropylene glycol n-butyl ether or comprise a conventional surfactant in place of tripropylene glycol n-butyl ether. The other components of the printing ink compositions are the same in each example and its corresponding comparative example.

TABLE 1

Example 1

| | Ink Compositions | | | |
|---|---|---|---|---|
| | black | magenta | cyan | yellow |
| purified water | 90% | 92% | 92% | 92% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 1% | 1% | 1% | 1% |
| triethylene glycol n-butyl ether | 5% | 5% | 5% | 5% |

TABLE 2

Example 2

| | Ink Compositions | | | |
|---|---|---|---|---|
| | black | magenta | cyan | yellow |
| purified water | 90% | 92% | 92% | 92% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |

TABLE 2-continued

Example 2

| | Ink Compositions | | | |
|---|---|---|---|---|
| | black | magenta | cyan | yellow |
| C.I. Direct Red 80 | 0% | 0% | 2% | 0% |
| C.I. Direct Yellow 142 | 0% | 0% | 0% | 2% |
| tripropylene glycol n-butyl ether | 1% | 1% | 1% | 1% |
| propylene glycol n-butyl ether | 5% | 5% | 5% | 5% |

TABLE 3

Example 3

| | Ink Compositions | | | |
|---|---|---|---|---|
| | black | magenta | cyan | yellow |
| purified water | 75% | 77% | 77% | 77% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 1% | 1% | 1% | 1% |
| triethylene glycol n-butyl ether | 5% | 5% | 5% | 5% |
| glycerin | 5% | 5% | 5% | 5% |
| diethylene glycol | 10% | 10% | 10% | 10% |

TABLE 4

Example 4

| | Ink Compositions | | | |
|---|---|---|---|---|
| | black | magenta | cyan | yellow |
| purified water | 75% | 77% | 77% | 77% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 1% | 1% | 1% | 1% |
| triethylene glycol n-butyl ether | 5% | 5% | 5% | 5% |
| glycerin | 5% | 5% | 5% | 5% |
| diethylene glycol | 10% | 10% | 10% | 10% |

TABLE 5

Example 5

| | Ink Compositions | | | |
|---|---|---|---|---|
| | black | magenta | cyan | yellow |
| purified water | 77% | 79% | 79% | 79% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 1% | 1% | 1% | 1% |
| triethylene glycol n-butyl ether | 3% | 3% | 3% | 3% |
| glycerin | 5% | 5% | 5% | 5% |
| diethylene glycol | 10% | 10% | 10% | 10% |

TABLE 6

Example 6

| | Ink Compositions | | | |
|---|---|---|---|---|
| | black | magenta | cyan | yellow |
| purified water | 75% | 77% | 77% | 77% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 1% | 1% | 1% | 1% |
| propylene glycol n-butyl ether | 5% | 5% | 5% | 5% |
| glycerin | 5% | 5% | 5% | 5% |
| diethylene glycol | 10% | 10% | 10% | 10% |

TABLE 7

Example 7

| | Ink Compositions | | | |
|---|---|---|---|---|
| | black | magenta | cyan | yellow |
| purified water | 69% | 72% | 72% | 72% |
| C.I. Direct Black 17 | 3% | 0% | 0% | 0% |
| C.I. Direct Black 108 | 3% | 0% | 0% | 0% |
| C.I. Direct Blue 90 | 0% | 3% | 0% | 0% |
| C.I. Direct Red 83 | 0% | 0% | 3% | 0% |
| C.I. Direct Yellow 98 | 0% | 0% | 0% | 3% |
| tripropylene glycol n-butyl ether | 1% | 1% | 1% | 1% |
| triethylene glycol n-butyl ether | 9% | 9% | 9% | 9% |
| glycerin | 5% | 5% | 5% | 5% |
| diethylene glycol | 10% | 10% | 10% | 10% |

TABLE 8

Example 8

| | Ink Compositions | | | |
|---|---|---|---|---|
| | black | magenta | cyan | yellow |
| purified water | 69% | 72% | 72% | 72% |
| C.I. Direct Black 17 | 3% | 0% | 0% | 0% |
| C.I. Direct Black 108 | 3% | 0% | 0% | 0% |
| C.I. Direct Blue 90 | 0% | 3% | 0% | 0% |
| C.I. Direct Red 83 | 0% | 0% | 3% | 0% |
| C.I. Direct Yellow 98 | 0% | 0% | 0% | 3% |
| tripropylene glycol n-butyl ether | 5% | 5% | 5% | 5% |
| triethylene glycol n-butyl ether | 5% | 5% | 5% | 5% |
| glycerin | 5% | 5% | 5% | 5% |
| diethylene glycol | 10% | 10% | 10% | 10% |

TABLE 9

Example 9

| | Ink Compositions | | | |
|---|---|---|---|---|
| | black | magenta | cyan | yellow |
| purified water | 69% | 72% | 72% | 72% |
| C.I. Direct Black 17 | 3% | 0% | 0% | 0% |
| C.I. Direct Black 108 | 3% | 0% | 0% | 0% |
| C.I. Direct Blue 90 | 0% | 3% | 0% | 0% |
| C.I. Direct Red 83 | 0% | 0% | 3% | 0% |
| C.I. Direct Yellow 98 | 0% | 0% | 0% | 3% |
| tripropylene glycol n-butyl ether | 1% | 1% | 1% | 1% |
| diethylene glycol n-butyl ether | 9% | 9% | 9% | 9% |

TABLE 9-continued

Example 9

| | Ink Compositions | | | |
|---|---|---|---|---|
| | black | magenta | cyan | yellow |
| glycerin | 5% | 5% | 5% | 5% |
| diethylene glycol | 10% | 10% | 10% | 10% |

TABLE 10

Example 10

| | Ink Compositions | | | |
|---|---|---|---|---|
| | black | magenta | cyan | yellow |
| purified water | 69% | 72% | 72% | 72% |
| C.I. Direct Black 17 | 3% | 0% | 0% | 0% |
| C.I. Direct Black 108 | 3% | 0% | 0% | 0% |
| C.I. Direct Blue 90 | 0% | 3% | 0% | 0% |
| C.I. Direct Red 83 | 0% | 0% | 3% | 0% |
| C.I. Direct Yellow 98 | 0% | 0% | 0% | 3% |
| tripropylene glycol n-butyl ether | 5% | 5% | 5% | 5% |
| diethylene glycol n-butyl ether | 5% | 5% | 5% | 5% |
| glycerin | 5% | 5% | 5% | 5% |
| diethylene glycol | 10% | 10% | 10% | 10% |

TABLE 11

Example 11

| | Ink Compositions | | | |
|---|---|---|---|---|
| | black | magenta | cyan | yellow |
| purified water | 67% | 69% | 69% | 69% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 3% | 3% | 3% | 3% |
| propylene glycol n-butyl ether | 3% | 3% | 3% | 3% |
| triethylene glycol n-butyl ether | 3% | 3% | 3% | 3% |
| glycerin | 10% | 10% | 10% | 10% |
| diethylene glycol | 10% | 10% | 10% | 10% |

TABLE 12

Example 12

| | Ink Compositions | | | |
|---|---|---|---|---|
| | black | magenta | cyan | yellow |
| purified water | 67% | 69% | 69% | 69 |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 3% | 3% | 3% | 3% |
| propylene glycol n-butyl ether | 3% | 3% | 3% | 3% |
| diethylene glycol n-butyl ether | 3% | 3% | 3% | 3% |
| glycerin | 10% | 10% | 10% | 10% |
| diethylene glycol | 10% | 10% | 10% | 10% |

TABLE 13

Example 13

| | Ink Compositions | | | |
|---|---|---|---|---|
| | black | magenta | cyan | yellow |
| purified water | 67% | 69% | 69% | 69% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 3% | 3% | 3% | 3% |
| triethylene glycol n-butyl ether | 3% | 3% | 3% | 3% |
| diethylene glycol n-butyl ether | 3% | 3% | 3% | 3% |
| glycerin | 10% | 10% | 10% | 10% |
| diethylene glycol | 10% | 10% | 10% | 10% |

TABLE 14

Example 14

| | Ink Compositions | | | |
|---|---|---|---|---|
| | black | magenta | cyan | yellow |
| purified water | 44% | 69% | 69% | 69% |
| CABOJET 300 (produced by Cabot Specialty Chemicals Inc.) | 27% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 3% | 3% | 3% | 3% |
| triethylene glycol n-butyl ether | 3% | 3% | 3% | 3% |
| diethylene glycol n-butyl ether | 3% | 3% | 3% | 3% |
| glycerin | 10% | 10% | 10% | 10% |
| diethylene glycol | 10% | 10% | 10% | 10% |

CABOJET 300 is a dispersing element of carbon black, comprising 85% by weight of water and 15% by weight of a pigment (namely, carbon black) based on a total weight of the dispersing element.

TABLE 15

Comparative Example 1

| | Ink Compositions | | | |
|---|---|---|---|---|
| | black | magenta | cyan | yellow |
| purified water | 90% | 92% | 92% | 92% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| triethylene glycol n-butyl ether | 6% | 6% | 6% | 6% |

TABLE 16

Comparative Example 2

| | Ink Compositions | | | |
|---|---|---|---|---|
| | black | magenta | cyan | yellow |
| purified water | 90% | 92% | 92% | 92% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |

TABLE 16-continued

Comparative Example 2

| | Ink Compositions | | | |
|---|---|---|---|---|
| | black | magenta | cyan | yellow |
| C.I. Direct Yellow 142 | 0% | 0% | 0% | 2% |
| propylene glycol n-butyl ether | 6% | 6% | 6% | 6% |

TABLE 17

Comparative Example 3

| | Ink Compositions | | | |
|---|---|---|---|---|
| | black | magenta | cyan | yellow |
| purified water | 75% | 77% | 77% | 77% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| triethylene glycol n-butyl ether | 6% | 6% | 6% | 6% |
| glycerin | 5% | 5% | 5% | 5% |
| diethylene glycol | 10% | 10% | 10% | 10% |

TABLE 18

Comparative Example 4

| | Ink Compositions | | | |
|---|---|---|---|---|
| | black | magenta | cyan | yellow |
| purified water | 75% | 77% | 77% | 77% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| EMULGEN 810 (produced by Kao. Co) | 1% | 1% | 1% | 1% |
| triethylene glycol n-butyl ether | 5% | 5% | 5% | 5% |
| glycerin | 5% | 5% | 5% | 5% |
| diethylene glycol | 10% | 10% | 10% | 10% |

TABLE 19

Comparative Example 5

| | Ink Compositions | | | |
|---|---|---|---|---|
| | black | magenta | cyan | yellow |
| purified water | 77% | 79% | 79% | 79% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| tripropylene glycol n-butyl ether | 4% | 4% | 4% | 4% |
| glycerin | 5% | 5% | 5% | 5% |
| diethylene glycol | 10% | 10% | 10% | 10% |

TABLE 20

Comparative Example 6

| | Ink Compositions | | | |
|---|---|---|---|---|
| | black | magenta | cyan | yellow |
| purified water | 75% | 77% | 77% | 77% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| propylene glycol n-butyl ether | 6% | 6% | 6% | 6% |
| glycerin | 5% | 5% | 5% | 5% |
| diethylene glycol | 10% | 10% | 10% | 10% |

TABLE 21

Comparative Example 7

| | Ink Compositions | | | |
|---|---|---|---|---|
| | black | magenta | cyan | yellow |
| purified water | 71% | 73% | 73% | 73% |
| C.I. Direct Black 17 | 2% | 0% | 0% | 0% |
| C.I. Direct Black 108 | 2% | 0% | 0% | 0% |
| C.I. Direct Blue 90 | 0% | 2% | 0% | 0% |
| C.I. Direct Red 83 | 0% | 0% | 2% | 0% |
| C.I. Direct Yellow 98 | 0% | 0% | 0% | 2% |
| triethylene glycol n-butyl ether | 10% | 10% | 10% | 10% |
| glycerin | 5% | 5% | 5% | 5% |
| diethylene glycol | 10% | 10% | 10% | 10% |

TABLE 22

Comparative Example 8

| | Ink Compositions | | | |
|---|---|---|---|---|
| | black | magenta | cyan | yellow |
| purified water | 71% | 73% | 73% | 73% |
| C.I. Direct Black 17 | 2% | 0% | 0% | 0% |
| C.I. Direct Black 108 | 2% | 0% | 0% | 0% |
| C.I. Direct Blue 90 | 0% | 2% | 0% | 0% |
| C.I. Direct Red 83 | 0% | 0% | 2% | 0% |
| C.I. Direct Yellow 98 | 0% | 0% | 0% | 2% |
| triethylene glycol n-butyl ether | 10% | 10% | 10% | 10% |
| glycerin | 5% | 5% | 5% | 5% |
| diethylene glycol | 10% | 10% | 10% | 10% |

TABLE 23

Comparative Example 9

| | Ink Compositions | | | |
|---|---|---|---|---|
| | black | magenta | cyan | yellow |
| purified water | 71% | 73% | 73% | 73% |
| C.I. Direct Black 17 | 2% | 0% | 0% | 0% |
| C.I. Direct Black 108 | 2% | 0% | 0% | 0% |
| C.I. Direct Blue 90 | 0% | 2% | 0% | 0% |
| C.I. Direct Red 83 | 0% | 0% | 2% | 0% |
| C.I. Direct Yellow 98 | 0% | 0% | 0% | 2% |
| diethylene glycol n-butyl ether | 10% | 10% | 10% | 10% |
| glycerin | 5% | 5% | 5% | 5% |
| diethylene glycol | 10% | 10% | 10% | 10% |

TABLE 24

Comparative Example 10

| | Ink Compositions | | | |
|---|---|---|---|---|
| | black | magenta | cyan | yellow |
| purified water | 71% | 73% | 73% | 73% |
| C.I. Direct Black 17 | 2% | 0% | 0% | 0% |
| C.I. Direct Black 108 | 2% | 0% | 0% | 0% |
| C.I. Direct Blue 90 | 0% | 2% | 0% | 0% |
| C.I. Direct Red 83 | 0% | 0% | 2% | 0% |
| C.I. Direct Yellow 98 | 0% | 0% | 0% | 2% |
| diethylene glycol n-butyl ether | 10% | 10% | 10% | 10% |
| glycerin | 5% | 5% | 5% | 5% |
| diethylene glycol | 10% | 10% | 10% | 10% |

TABLE 25

Comparative Example 11

| | Ink Compositions | | | |
|---|---|---|---|---|
| | black | magenta | cyan | yellow |
| purified water | 67% | 69% | 69% | 69% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| propylene glycol n-butyl ether | 4.5% | 4.5% | 4.5% | 4.5% |
| triethylene glycol n-butyl ether | 4.5% | 4.5% | 4.5% | 4.5% |
| glycerin | 10% | 10% | 10% | 10% |
| diethylene glycol | 10% | 10% | 10% | 10% |

TABLE 26

Comparative Example 12

| | Ink Compositions | | | |
|---|---|---|---|---|
| | black | magenta | cyan | yellow |
| purified water | 67% | 69% | 69% | 69% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| propylene glycol n-butyl ether | 4.5% | 4.5% | 4.5% | 4.5% |
| diethylene glycol n-butyl ether | 4.5% | 4.5% | 4.5% | 4.5% |
| glycerin | 10% | 10% | 10% | 10% |
| diethylene glycol | 10% | 10% | 10% | 10% |

TABLE 27

Comparative Example 13

| | Ink Compositions | | | |
|---|---|---|---|---|
| | black | magenta | cyan | yellow |
| purified water | 67% | 69% | 69% | 69% |
| C.I. Direct Black 154 | 2% | 0% | 0% | 0% |
| C.I. Direct Black 19 | 2% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| triethylene glycol-n-butyl ether | 4.5% | 4.5% | 4.5% | 4.5% |
| diethylene glycol-n-butyl ether | 4.5% | 4.5% | 4.5% | 4.5% |

TABLE 27-continued

Comparative Example 13

| | Ink Compositions | | | |
|---|---|---|---|---|
| | black | magenta | cyan | yellow |
| glycerin | 10% | 10% | 10% | 10% |
| diethylene glycol | 10% | 10% | 10% | 10% |

TABLE 28

Comparative Example 14

| | Ink Compositions | | | |
|---|---|---|---|---|
| | black | magenta | cyan | yellow |
| purified water | 44% | 69% | 69% | 69% |
| CABOJET 300 (produced by Cabot Specialty Chemicals Inc.) | 27% | 0% | 0% | 0% |
| C.I. Direct Blue 199 | 0% | 2% | 0% | 0% |
| C.I. Direct Red 80 | 0% | 0% | 2% | 0% |
| C.I. Direct Yellow 142 | 0% | 0% | 0% | 2% |
| triethylene glycol n-butyl ether | 4.5% | 4.5% | 4.5% | 4.5% |
| diethylene glycol n-butyl ether | 4.5% | 4.5% | 4.5% | 4.5% |
| glycerin | 10% | 10% | 10% | 10% |
| diethylene glycol | 10% | 10% | 10% | 10% |

[Printing] Ink-jet printing is performed on a plain paper (Xerox 4200) by using an ink-jet printer (MFC-7150C produced by Brother Kogyo Kabushiki Kaisha) with the black, cyan, magenta, and yellow inks of each of the examples so as to form sample images and reference images.

In each of the sample images, characters are printed in point size of 11 by using Microsoft Word 97 in one of the black, cyan, magenta and yellow inks with their background of a different color. Combinations of ink colors are indicated in Tables 29A to 29D and 30A to 30D. In the reference images, characters are printed in the same way to the sample images with no background.

[Evaluation] The performances of the printing ink compositions are evaluated based on the following criteria, by comparing the sample images and the reference images and determining visually whether color bleeding occurred in the printed characters of the sample images. The evaluation results are indicated in Tables 29A to 29D and 30A to 30D.

very good: sharp characters with almost no color bleeding
good: readable characters with a little color bleeding
not good: blurred characters with color bleeding
poor: illegible characters with heavy color bleeding

TABLE 29A

| Ink Compositions | | | | | |
|---|---|---|---|---|---|
| characters | background | Example 1 | Example 2 | Example 3 | Example 4 |
| black | yellow | good | good | good | good |
| black | cyan | good | good | good | good |
| black | magenta | good | good | good | good |
| yellow | black | good | good | good | good |
| yellow | cyan | good | good | good | good |
| yellow | magenta | good | good | good | good |
| cyan | black | good | good | good | good |
| cyan | yellow | good | good | good | good |
| cyan | magenta | good | good | good | good |
| magenta | black | good | good | good | good |

TABLE 29A-continued

| Ink Compositions | | | | | |
|---|---|---|---|---|---|
| characters | background | Example 1 | Example 2 | Example 3 | Example 4 |
| magenta | yellow | good | good | good | good |
| magenta | cyan | good | good | good | good |

TABLE 29B

| Ink Compositions | | | | | |
|---|---|---|---|---|---|
| characters | background | Example 5 | Example 6 | Example 7 | Example 8 |
| black | yellow | good | good | very good | very good |
| black | cyan | good | good | very good | very good |
| black | magenta | good | good | very good | very good |
| yellow | black | good | good | very good | very good |
| yellow | cyan | good | good | very good | very good |
| yellow | magenta | good | good | very good | very good |
| cyan | black | good | good | very good | very good |
| cyan | yellow | good | good | very good | very good |
| cyan | magenta | good | good | very good | very good |
| magenta | black | good | good | very good | very good |
| magenta | yellow | good | good | very good | very good |
| magenta | cyan | good | good | very good | very good |

TABLE 29C

| Ink Compositions | | | | | |
|---|---|---|---|---|---|
| characters | background | Example 9 | Example 10 | Example 11 | Example 12 |
| black | yellow | very good | very good | very good | very good |
| black | cyan | very good | very good | very good | very good |
| black | magenta | very good | very good | very good | very good |
| yellow | black | very good | very good | very good | very good |
| yellow | cyan | very good | very good | very good | very good |
| yellow | magenta | very good | very good | very good | very good |
| cyan | black | very good | very good | very good | very good |
| cyan | yellow | very good | very good | very good | very good |
| cyan | magenta | very good | very good | very good | very good |
| magenta | black | very good | very good | very good | very good |
| magenta | yellow | very good | very good | very good | very good |
| magenta | cyan | very good | very good | very good | very good |

TABLE 29D

| Ink Compositions | | | |
|---|---|---|---|
| character | background | Example 13 | Example 14 |
| black | yellow | very good | very good |
| black | cyan | very good | very good |
| black | magenta | very good | very good |
| yellow | black | very good | very good |
| yellow | cyan | very good | very good |
| yellow | magenta | very good | very good |
| cyan | black | very good | very good |
| cyan | yellow | very good | very good |
| cyan | magenta | very good | very good |
| magenta | black | very good | very good |
| magenta | yellow | very good | very good |
| magenta | cyan | very good | very good |

TABLE 30A

| Ink Compositions | | Comparative Example 1 | Comparative Example 2 | Comparative Example 3 | Comparative Example 4 |
|---|---|---|---|---|---|
| characters | background | | | | |
| black | yellow | bad | bad | bad | bad |
| black | cyan | bad | bad | bad | bad |
| black | magenta | bad | bad | bad | bad |
| yellow | black | bad | bad | bad | bad |
| yellow | cyan | bad | bad | bad | bad |
| yellow | magenta | bad | bad | bad | bad |
| cyan | black | bad | bad | bad | bad |
| cyan | yellow | bad | bad | bad | bad |
| cyan | magenta | bad | bad | bad | bad |
| magenta | black | bad | bad | bad | bad |
| magenta | yellow | bad | bad | bad | bad |
| magenta | cyan | bad | bad | bad | bad |

TABLE 30B

| Ink Compositions | | Comparative Example 5 | Comparative Example 6 | Comparative Example 7 | Comparative Example 8 |
|---|---|---|---|---|---|
| characters | background | | | | |
| black | yellow | bad | bad | not good | not good |
| black | cyan | bad | bad | not good | not good |
| black | magenta | bad | bad | not good | not good |
| yellow | black | bad | bad | not good | not good |
| yellow | cyan | bad | bad | not good | not good |
| yellow | magenta | bad | bad | not good | not good |
| cyan | black | bad | bad | not good | not good |
| cyan | yellow | bad | bad | not good | not good |
| cyan | magenta | bad | bad | not good | not good |
| magenta | black | bad | bad | not good | not good |
| magenta | yellow | bad | bad | not good | not good |
| magenta | cyan | bad | bad | not good | not good |

TABLE 30C

| Ink Compositions | | Comparative Example 9 | Comparative Example 10 | Comparative Example 11 | Comparative Example 12 |
|---|---|---|---|---|---|
| characters | background | | | | |
| black | yellow | not good | not good | not good | not good |
| black | cyan | not good | not good | not good | not good |
| black | magenta | not good | not good | not good | not good |
| yellow | black | not good | not good | not good | not good |
| yellow | cyan | not good | not good | not good | not good |
| yellow | magenta | not good | not good | not good | not good |
| cyan | black | not good | not good | not good | not good |
| cyan | yellow | not good | not good | not good | not good |
| cyan | magenta | not good | not good | not good | not good |
| magenta | black | not good | not good | not good | not good |
| magenta | yellow | not good | not good | not good | not good |
| magenta | cyan | not good | not good | not good | not good |

TABLE 30D

| Ink Compositions | | Comparative Example 13 | Comparative Example 14 |
|---|---|---|---|
| characters | background | | |
| black | yellow | not good | not good |
| black | cyan | not good | not good |
| black | magenta | not good | not good |
| yellow | black | not good | not good |
| yellow | cyan | not good | not good |
| yellow | magenta | not good | not good |
| cyan | black | not good | not good |
| cyan | yellow | not good | not good |

TABLE 30D-continued

| Ink Compositions | | Comparative | Comparative |
|---|---|---|---|
| characters | background | Example 13 | Example 14 |
| cyan | magenta | not good | not good |
| magenta | black | not good | not good |
| magenta | yellow | not good | not good |
| magenta | cyan | not good | not good |

As mentioned above, the printing ink compositions of Examples 1 to 14 each comprise two or three types of polyalkylene glycol alkyl ethers, one of which is tripropylene glycol n-butyl ether. On the other hand, the printing ink compositions of Comparative Examples 1 to 14 each comprise one or two types of polyalkylene glycol alkyl ether, none of which is polypropylene glycol n-butyl ether. The printing ink compositions of Comparative Example 4 comprise a conventional surfactant in place of polypropylene glycol n-butyl ether.

As is apparent from the above-indicated evaluation results, color bleeding did not occur when performing ink-jet printing with the printing ink compositions of Examples 1 to 14 according to the invention. All the printed images are of high image quality in Examples 1 to 14. However, color bleeding occurred so severely with the printing ink compositions of Comparative Examples 1 to 14 that the printed images were blurred and illegible.

Although the invention has been described in detail with reference to the above-mentioned examples, it is evident that many alternatives, modifications and variations may be apparent to those skilled in the art. Various changes may be made without departing from the spirit and scope of the invention as defined by the following claims.

What is claimed is:

1. An ink composition, comprising:

water;

a coloring agent; and at least two different types of polyalkylene glycol alkyl ethers each having at least one oxyalkylene in a polyoxyalkylene group, wherein at least one of the polyalkylene glycol alkyl ethers is polypropylene glycol n-butyl ether having three or more oxypropylenes in its molecule.

2. The ink composition as claimed in claim 1, wherein each of the polyalkylene glycol alkyl ethers has five or fewer carbons in its alkyl group and twelve or fewer carbons in its oxyalkylene group.

3. The ink composition as claimed in claim 1, comprising 10 to 98% by weight of the water, 0.1 to 20% by weight of the coloring agent, and 0.1 to 20% by weight of polyalkylene glycol alkyl ethers, based on the total weight of the ink composition.

4. The ink composition as claimed in claim 3, comprising 30 to 97% by weight of the water, 0.3 to 15% by weight of the coloring agent, and 0.3 to 15% by weight of the polyalkylene glycol alkyl ethers, based on the total weight of the ink composition.

5. The ink composition as claimed in claim 4, comprising 40 to 95% by weight of the water, 0.5 to 15% by weight of the coloring agent, and 0.5 to 10% by weight of the polyalkylene glycol alkyl ethers, based on the total weight of the ink composition.

6. The ink composition as claimed in claim 1, comprising 1 to 80% by weight of the polyalkylene glycol alkyl ethers other than the polypropylene glycol n-butyl ether having three or more oxypropylenes in the molecule, based on a total weight of the polyalkylene glycol alkyl ethers.

7. The ink composition as claimed in claim 6, comprising 3 to 60% by weight of the polyalkylene glycol alkyl ethers other than the polypropylene glycol n-butyl ether having three or more oxypropylenes in the molecule, based on a total weight of the polyalkylene glycol alkyl ethers.

8. The ink composition as claimed in claim 7, comprising 5 to 50% by weight of the polyalkylene glycol alkyl ethers other than the polypropylene glycol n-butyl ether having three or more oxypropylenes in the molecule, based on the total weight of the polyalkylene glycol alkyl ethers.

9. The ink composition as claimed in claim 1, wherein the polypropylene glycol n-butyl ether having three or more oxypropylenes in the molecule is tripropylene glycol n-butyl ether, tetrapropylene glycol n-butyl ether, or pentapropylene glycol n-butyl ether.

10. The ink composition as claimed in claim 1, wherein less than all of the polyalkylene glycol alkyl ethers is polypropylene glycol n-butyl ether having three or more oxypropylenes in its molecule.

11. The ink composition as claimed in claim 1, wherein the coloring agent is at least one of a dye and a pigment.

12. The ink composition as claimed in claim 11, wherein the dye is a water-soluble dye selected from a group consisting of direct dyes, acid dyes, basic dyes and reactive dyes.

13. The ink composition as claimed in claim 11, wherein the pigment is at least one of an inorganic pigment and an organic pigment.

14. The ink composition as claimed in claim 13, further comprising a dispersing agent.

15. The ink composition as claimed in claim 1, further comprising at least one of a dispersing agent, a surfactant, a viscosity adjusting agent, a surface tension adjusting agent, a pH adjusting agent, a liquid stabilizer, an antiseptic and a fungicide.

16. The ink composition of claim 1, wherein said polyalkylene glycol alkyl ethers comprise at least one of a polyethylene glycol alkyl ether having at least one oxyethylene group and a polypropylene glycol alkyl ether having at least one oxypropylene group.

17. The ink composition of claim 16, wherein said polyalkylene glycol alkyl ethers comprise at least one polyethylene glycol alkyl ether selected from the group consisting of ethylene glycol methyl ether, ethylene glycol ethyl ether, ethylene glycol n-propyl ether, ethylene glycol isopropyl ether, ethylene glycol n-butyl ether, ethylene glycol isobutyl ether, diethylene glycol methyl ether, diethylene glycol ethyl ether, diethylene glycol n-propyl ether, diethylene glycol isopropyl ether, diethylene glycol n-butyl ether, diethylene glycol isobutyl ether, triethylene glycol methyl ether, triethylene glycol ethyl ether, triethylene glycol n-propyl ether, triethylene glycol isopropyl ether, triethylene glycol n-butyl ether and triethylene glycol isobutyl ether.

18. The ink composition of claim 16, wherein said polyalkylene glycol alkyl ethers comprise at least one polyethylene glycol n-butyl ether having at least one oxyethylene group.

19. The ink composition of claim 16, wherein said polyalkylene glycol alkyl ethers comprise at least one polypropylene glycol alkyl ether selected from the group consisting of propylene glycol methyl ether, propylene glycol ethyl ether, propylene glycol n-propyl ether, propylene glycol isopropyl ether, propylene glycol n-butyl ether, propylene glycol isobutyl ether, dipropylene glycol methyl ether, dipropylene glycol ethyl ether, dipropylene glycol n-propyl ether, dipropylene glycol isopropyl ether, dipropylene glycol n-butyl ether, dipropylene glycol isobutyl ether, tripropylene glycol methyl ether, tripropylene glycol ethyl ether, tripropylene glycol n-propyl ether, and tripropylene glycol isopropyl ether.

20. The ink composition of claim 16, wherein said polyalkylene glycol alkyl ethers comprise at least one polypropylene glycol n-butyl ether having fewer than three oxypropylene groups.

* * * * *